Sept. 5, 1967 W. S. MACDONALD 3,340,447

DIGITAL SERVOMECHANISM

Filed Jan. 8, 1964 9 Sheets-Sheet 1

INVENTOR.
WALDRON S. MACDONALD
BY
Kenway, Jenney & Hildreth
ATTORNEYS

Sept. 5, 1967

W. S. MACDONALD 3,340,447

DIGITAL SERVOMECHANISM

Filed Jan. 8, 1964

9 Sheets-Sheet 2

INVENTOR.
WALDRON S. MACDONALD
BY
Kenway, Jenney & Hildreth
ATTORNEYS

INVENTOR.
WALDRON S. MACDONALD
BY
Kenway, Jenney & Hildreth
ATTORNEYS

INVENTOR.
WALDRON S. MACDONALD
BY
Kenway, Jenney & Hildreth
ATTORNEYS

INVENTOR.
WALDRON S. MACDONALD
BY
Kenway, Jenney & Hildreth
ATTORNEYS

Sept. 5, 1967 W. S. MACDONALD 3,340,447

DIGITAL SERVOMECHANISM

Filed Jan. 8, 1964 9 Sheets-Sheet 6

INVENTOR.
WALDRON S. MACDONALD
BY
Kenway, Jenney & Hildreth
ATTORNEYS

Sept. 5, 1967 W. S. MACDONALD 3,340,447

DIGITAL SERVOMECHANISM

Filed Jan. 8, 1964 9 Sheets-Sheet 7

INVENTOR.
WALDRON S. MACDONALD
BY
Kenway, Jenney & Hildreth
ATTORNEYS

Sept. 5, 1967 W. S. MACDONALD 3,340,447

DIGITAL SERVOMECHANISM

Filed Jan. 8, 1964 9 Sheets-Sheet 8

INVENTOR.
WALDRON S. MACDONALD
BY
Kenway, Jenney & Hildreth
ATTORNEYS

Sept. 5, 1967 W. S. MACDONALD 3,340,447

DIGITAL SERVOMECHANISM

Filed Jan. 8, 1964 9 Sheets-Sheet 9

INVENTOR.
WALDRON S. MACDONALD
BY
Kenway, Jenney & Hildreth
ATTORNEYS

United States Patent Office 3,340,447

Patented Sept. 5, 1967

3,340,447
DIGITAL SERVOMECHANISM

Waldron S. Macdonald, Concord, Mass., assignor to Northrop Corporation, Beverly Hills, Calif., a corporation of California Filed Jan. 8, 1964, Ser. No. 336,475
12 Claims. (Cl. 318—18)

My invention relates to servomechanisms, and particularly to an improved digital servomechanism for setting a shaft to a position defined by a digital command signal.

Briefly, a digital servomechanism in accordance with my invention comprises a servomotor having a shaft to be positioned; an amplifier for the servomotor; and signal summing means for combining command and response signals to supply an error signal to the amplifier. One of the response signals is a shaft position signal, produced by a selected one of a set of transducers driven by the shaft through progressively decreased drive ratios. The response signals may also include other components, such as a rate signal provided by a conventional rate generator driven by the shaft. The command signals are supplied two at a time, from a source of position address signals representing successively lower ordered digits of a shaft position with respect to a selected reference position. Control apparatus, described in detail below, is provided for sequentially applying progressively lower ordered pairs of adjacent-ordered position address signals from the source to the summing means. The highest ordered signal of each pair is stored in a register. As each pair of signals is applied, the rebalancing ratio of the servomechanism is selected, by selection of the shaft position tranducer having the appropriate drive ratio, so that the shaft motion in response to the applied signals is of an order of magnitude corresponding to the highest ordered signal in the selected pair. Means are preferably provided for interrupting the operation of the sequencing means while the shaft is in motion in response to the applied signals. After each adjustment of the shaft, the lowest ordered signal just applied is shifted into the register, becoming the highest ordered of the next pair of signals. By this arrangement, the position of the shaft is successively set in progressively smaller increments to a position corresponding to the number represented by the position address signals.

In accordance with the preferred embodiment of my invention, a servomotor is provided to adjust the element to be positioned. A control circuit for the servomotor is provided which incorporates a selected one of a series of position transducers for producing signals in response to the adjusted position of the controlled element. These transducers are driven with the positioned element through stepped gearing or other suitable proportioning means in such a manner that they are progressively more sensitive to motion of the element. A plurality of manually operable switches is provided for setting in the digits of a selected position of the controlled element. A programming counter is provided which successively supplies these digits to selected ones of the aforesaid transducers, in such a manner that the servomechanism is successively actuated to set the element to the highest ordered two digits of the desired position, then to the second and third highest ordered digits of the desired position, and so on until the final adjustment is made with the most sensitive transducer in the control circuit of the servomotor. The control circuit for the lowest ordered transducer, that is, the one with the greatest sensitivity, may be provided with an adjustment circuit which includes a second servomechanism. This servomechanism is provided with a servomotor having a control circuit which includes a selected one of a group of adjustable signal generators, each corresponding to a selected turret position and tool. The one of these signal generators corresponding to the tool in position is selected by circuits controlled by the turret and inserted in circuit with the second servomotor to control the null position of the lowest ordered transducer so that a correction dependent on tool wear or tool misalignment may be inserted manually. The same circuit includes means for compensating the null of the lowest ordered transducer for temperature.

A specific embodiment of my invention comprises a sequentially operable digital servomechanism for adjusting a machine tool element, such as an adjustable carriage stop or the like, to a selected position which may be expressed in terms of a number. The apparatus of my invention includes means automatically responsive to the temperature of the machine tool for introducing positioning corrections without the need for supervision by an operator. Additional apparatus is incorporated for manually superimposing a compensating adjustment on the positioning system which is a function of the particular tool in position on the turret and is selected by the operator to compensate for tool wear or tool misalignment. The system incorporates manually operable elements for introducing each digit of a number representing a selected position, and also includes manually operable means for introducing a continuously variable compensating factor which may affect the lowest ordered digits of the instructed position. Since the selected position may be inserted digitally, great precision in the final adjustment may be made without corresponding skill on the part of the operator. Accordingly, the requirements of skill and experience for operators of machines equipped with the apparatus of my invention are much less rigorous than are those for manually adjusted machines.

The apparatus of my invention will best be understood by reference to the following detailed description, together with the accompanying drawings, of a preferred embodiment thereof.

Figure 2:
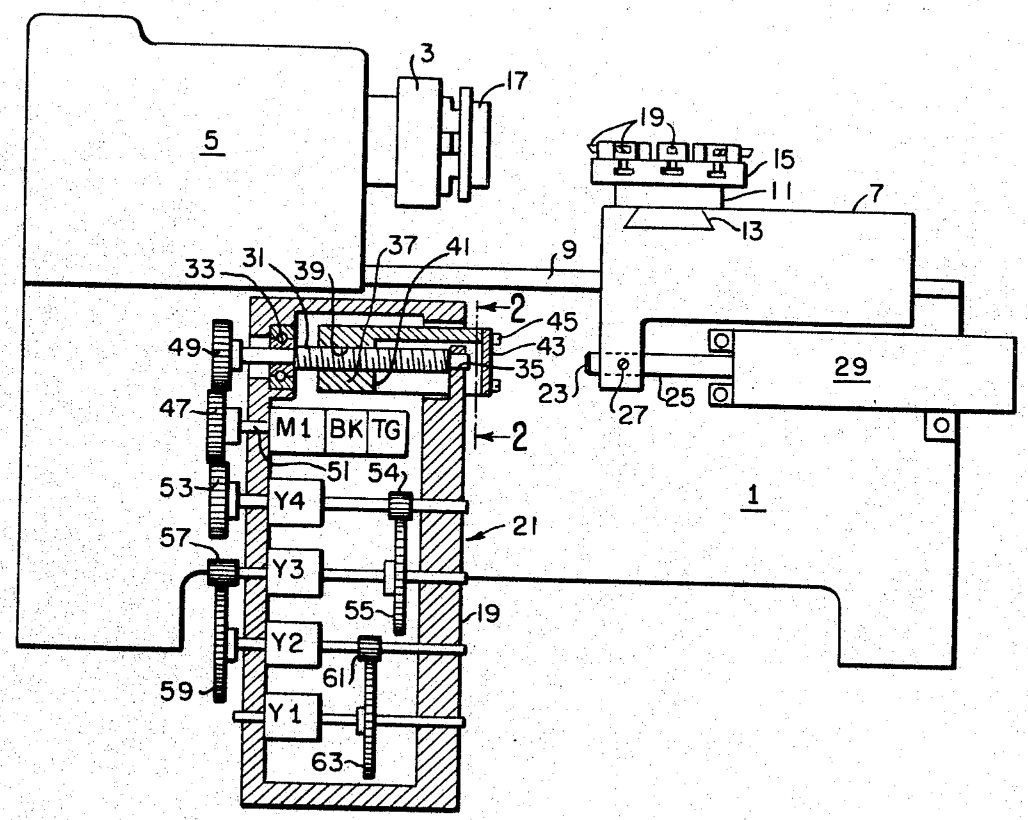
FIG. 2 is a schematic elevational view, with parts shown in cross section and parts shown in exaggerated proportion to illustrate details, of a turret lathe incorporating a numerical positioning system in accordance with a specific embodiment of my invention.
Figure 4:
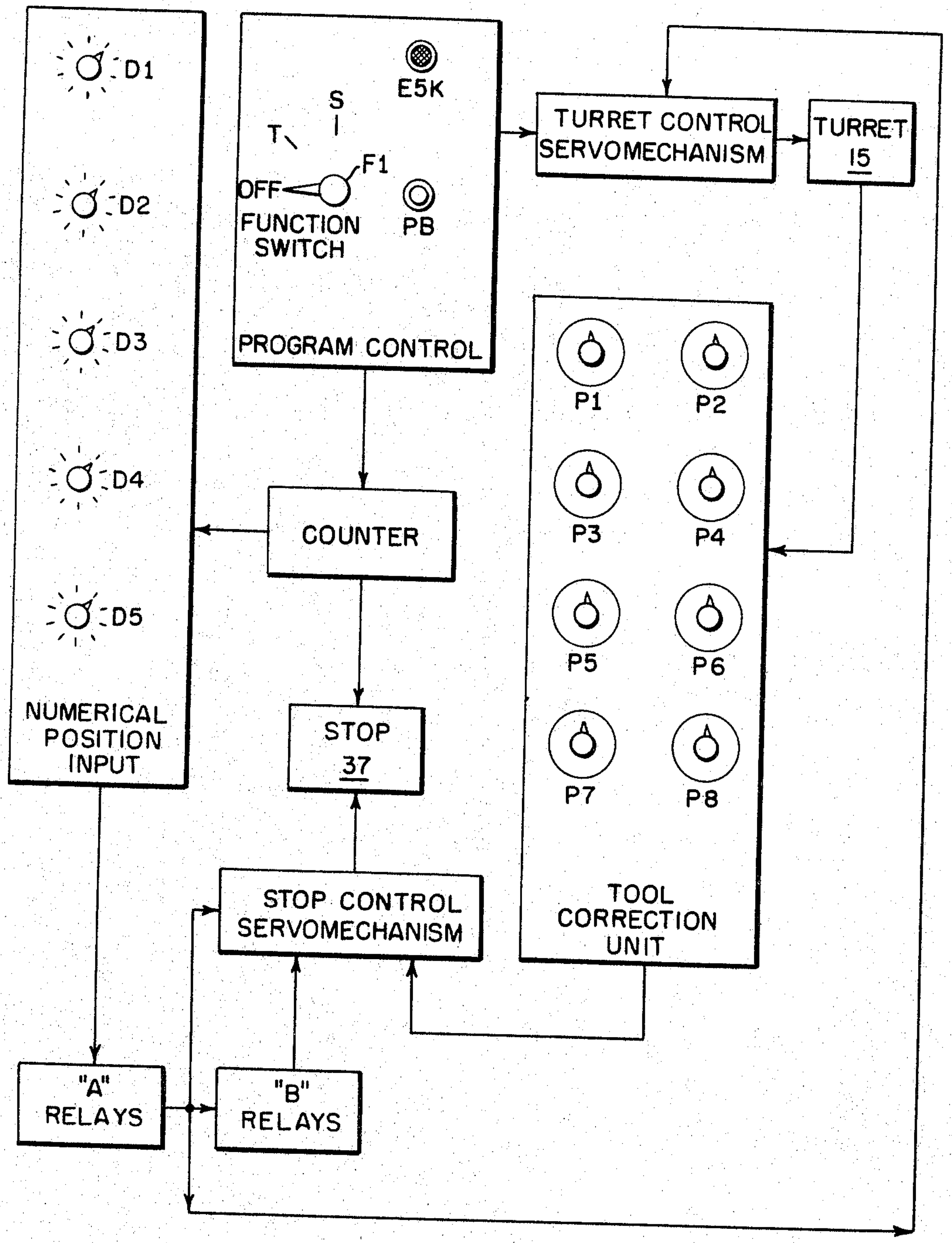
FIG. 4 is a block diagram of a positioning system for use in the lathe shown in FIG. 2.
Figure 6:
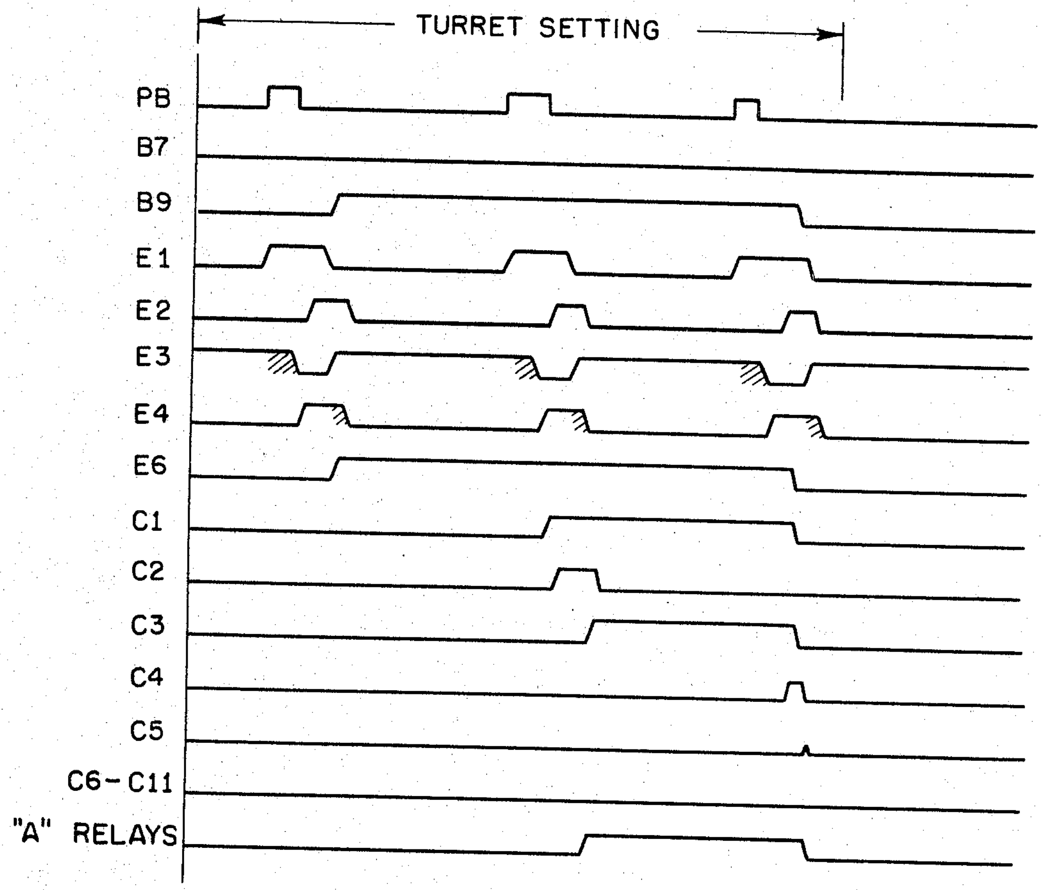
Figure 7:
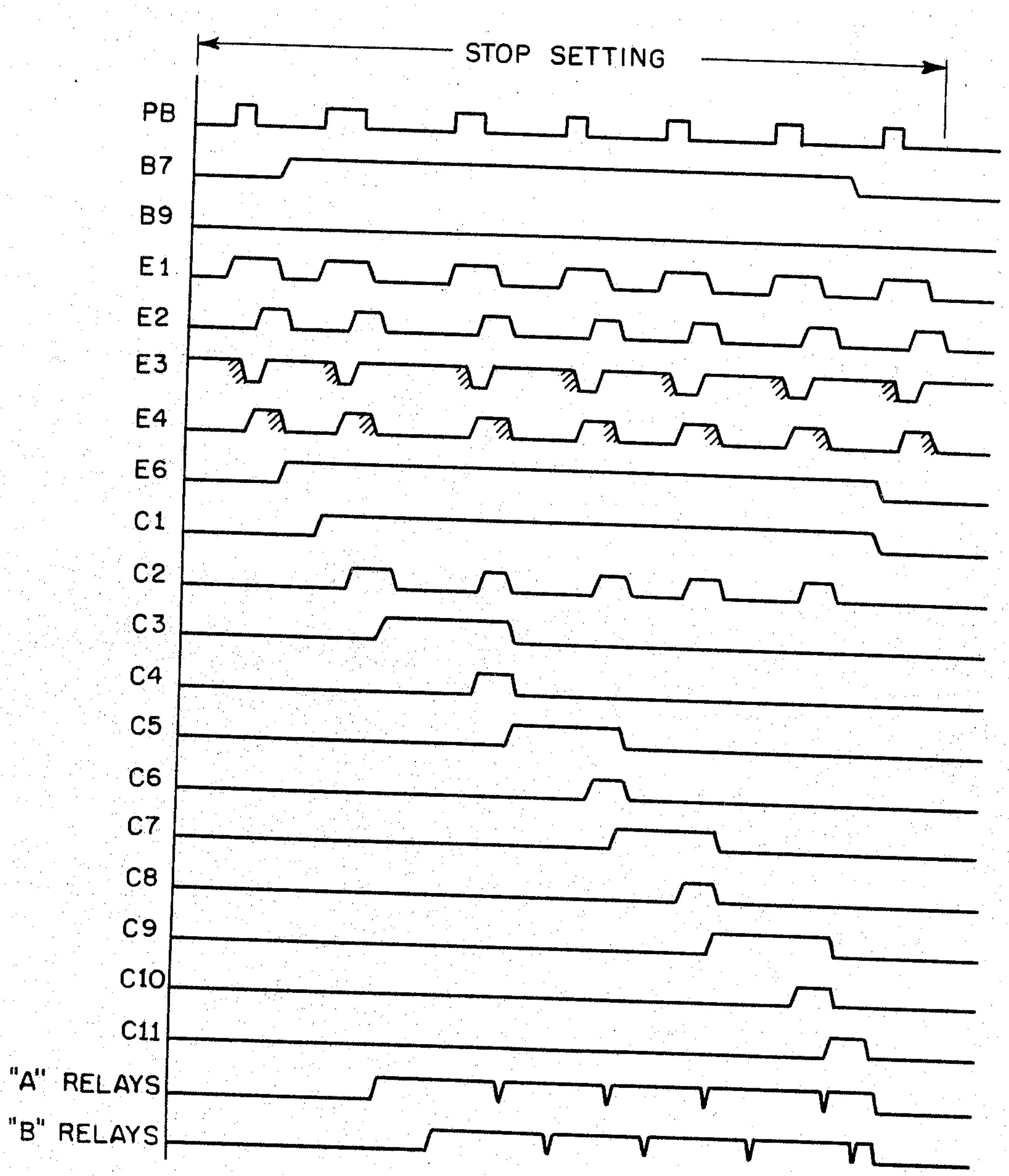

FIGS. *5a* through *5d*, when placed vertically side by side with FIG. *5a* at the left, comprise a schematic wiring diagram of the positioning system of FIG. 4;

FIG. 6 comprises a timing chart illustrating the operation of the system of my invention in setting the turret of the lathe of FIG. 2 to a selected position; and FIG. 7 comprises a timing chart illustrating the operation of the apparatus of FIGS. *5a* through *5d* in setting the adjustable stop of the turret lathe of FIG. 2 to a selected five digit position.

Figure 1:
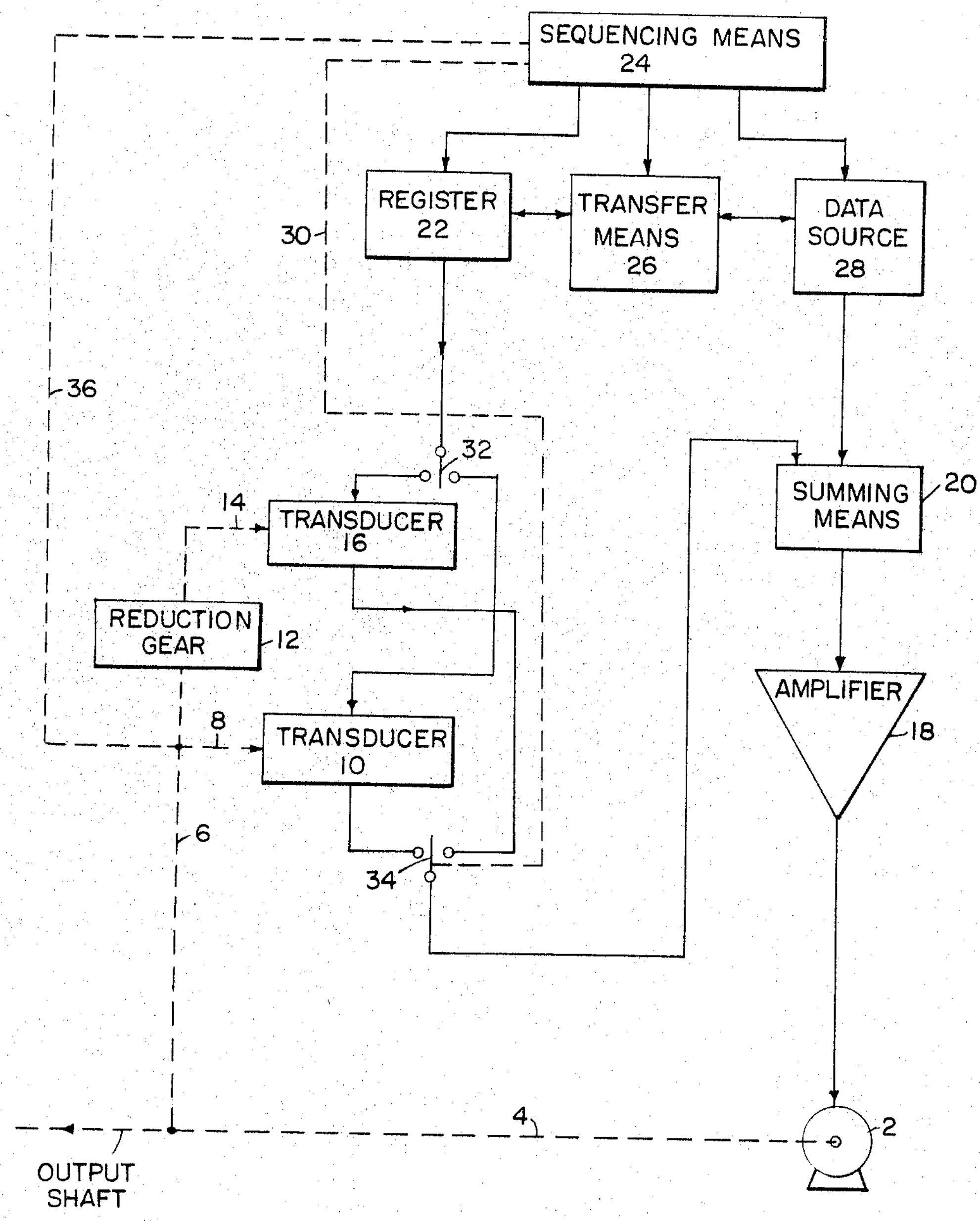
FIG. 1 is a schematic functional block diagram of a digital servomechanism in accordance with my invention.

Referring now to the drawings, FIG. 1 shows in schematic form the essential elements of a digital servomechanism in accordance with my invention. As schematically indicated, a servomotor 2 of any suitable conventional construction is provided with an output shaft 4 rotatable or otherwise movable over a range of positions for performing any desired control or indication function. As indicated by the dotted line 6, the output shaft 4 is drivably connected to the input shaft 8 of a first transducer 10, and, through a suitable motion reducing device such as a reduction gear 12, to the input shaft 14 of a second transducer 16. The transducers 10 and 16 may be any suitable conventional devices for combining a shaft position address signal with a mechanical shaft position signal to produce a periodic output error signal representing the sense and magnitude of the difference between the shaft position and the position directed by the address signal. The output signal must be a periodic function of the shaft position, since shaft movement over a range equal to an address signal of one magnitude will cause it to travel over more than one interval equal to an address signal of any lower magnitude. For example, conventional control transformers, or the like, may be employed as the transducers.

The servomotor 2 is provided with a conventional control amplifier 18 for providing energy to move the shaft 4 in one or an opposite sense in dependance on the sign of an error signal supplied from a conventional signal summing means 20. The summing means combines two applied signals to produce an error signal having a sign and magnitude determined by the sign and magnitude of the applied signals, such that the error signal is substantially zero when the applied signals are equal and opposite.

A first signal is supplied to the summing means 20 by a data source 28. The data source 28 may be any suitable conventional apparatus for supplying signals representing the digits of a shaft position in a desired number system and to the desired degree of accuracy. For example, a conventional tape reader having a tape on which successive shaft position addresses are recorded in binary digital or other desired code, may be employed, or the digits of an address may be supplied by manually operable switches settable to a number of positions corresponding to the number of numerical signs in the number system. The source must have storage capacity for at least one digit of one position address, however, since it must continue to apply one digit signal to the servomechanism, while another is applied by a register 22, to be described, until the shaft 4 comes to rest.

The register 22 has the capacity to store one position address signal representing a digit in a shaft position address defined with respect to a reference shaft position. Sequencing means 24, which may take the form described in more detail below in connection with a specific embodiment of my invention, at times actuates a transfer means 26 to transfer a position address signal to the register 22 from the data source 28.

As indicated by the dotted line 30, the sequencing means 24 controls switching means, such as the two switches 32 and 34, to direct a selected position address signal from the register 22 to the input of a selected one of the transducers 10 and 16, and to direct the output signal from the selected transducer to the summing means 20. In this manner, because the rebalancing ratio of the servomechanism is made differently by the reduction gear 12, the rebalancing mechanism of the servomechanism is changed to correspond to the order of the position address signals being applied.

In order for a positioning operation to be carried out the data source 28 must be in condition to provide a position address, such as 1.32 represented in binary code as 001, 011 and 010, and meaning, for example, that the shaft, or a selected object drivably connected to it, is 1.32 inches from the reference position. The sequencing means 24 is set into action by a suitable starting signal, and first transfers the highest ordered position address signal, or that representing 1 in the example here given, to the register 22. The contents of the register 2 are supplied to the transducer 16 over the switch 32. At the same time, the next lower ordered digit, or 3, is supplied to the summing means 20 from the data source 28. The output signal from the transducer 16 is applied to the summing means 20 over the switch 34, together with the signal from the data source 28. The servomotor 22 now operates until the output signal from the transducer 16 differs from its null value by an amount equal and opposite to the next lower ordered position address signal from the data source 28. The shaft is now in a position 1.3 inches from the reference position. During this time, further operation of the sequencing means is preferably interrupted, as by a shaft motion signal introduced by suitable means responsive to motion of the shaft 4, as indicated by the dotted line 36.

When the shaft 4 is again stationary, the sequencing means shifts the second ordered digit, 3 in the example above, into the register 22, discarding the digit 1 signal, and applies the lowest ordered digit, here 2, to the summing means. The transducer 10 is now connected to the register 22 and to the summing means 20, and the shaft is again moved until the output of the transducer 10 balances the signal from the source 28. When the servomechanism is balanced, the shaft 4 will be at a position 1.32 inches from the reference position.

The servomechanism of my invention is particularly adapted to the control of machine tools, such as turret lathes or the like, and specific advantages and additional features of novelty are realized in the specific embodiment of my invention suited to this purpose, and next to be described.

Referring now to FIG. 2, I have shown a turret lathe, which may be of the conventional variety incorporating a bed 1, a spindle 3, a spindle housing 5, a longitudinal feed carriage 7 slidably received on dovetail ways 9, a cross feed carriage 11 slidably received on dovetail ways 13, and a tool mounting turret 15 rotatably supported on the cross feed carriage. In a conventional manner, a workpiece to be machined can be secured in the chuck 17 for rotation with the spindle 3, and a series of tools 19 are mounted in the turret 15, the latter being arranged to be indexed to bring successive tools to bear on the work for multiple machining operations.

A stop mechanism, generally designated at 21, and shown greatly enlarged with respect to the rest of the lathe, is organized within a box-like casing 19 mounted on the lathe bed 1, for cooperation with an abutment 23 terminating a carriage drive shaft 25, which is secured to the longitudinal feed carriage 7 by means of a bolt 27. The tool carriage is adapted to be driven with the shaft 25 by a carriage positioning motor 29, which may preferably be hydraulically or pneumatically actuated. It will be understood that a similar motor is provided for driving the cross feed carriage 11 to position the tools on a transverse axis, and that a similar stop mechanism may be provided for the cross feed carriage. However, those elements may be substantially the same as those shown in conjunction with the longitudinal feed carriage, and may be controlled in the same way by an extension of the apparatus of my invention which will be obvious from the description of the control for the longitudinal feed carriage 7.

The stop mechanism 21 includes a lead screw 31 rotatably mounted in the casing 19 by means of a ball-bearing unit 33 capable of supporting radial and thrust loadings, and a plain bearing 35 formed in the casing 19. A stop 37 is threaded on the lead screw at 39 and is formed with a longitudinally extending recess 41 to permit translation along the axis of movement of the carriage 7. For convenience in assembly, an abutment plate 43 is formed as a separate part, being attached to the stop 37 by screws 45. It will be apparent that the stop may be translated longitudinally by rotation of the lead screw to any desired terminal position, at which the tool carriage will be halted by the abutment of the elements 43 and 23, against the force supplied by the motor 29.

The lead screw 31 is arranged to be driven through the gears 47 and 49 by a servomotor M1 which has its stator connected to the housing 19. The motor M1 may be a conventional electrical servomotor of the type familiar to those skilled in the art, having an output shaft 51 connected to the gear 47, which is in mesh with the gear 49, the latter being affixed to the lead screw 31.

Also mounted on the motor M1 are an electromagnetic brake BK of conventional design, and a conventional tachometer generator TG, the latter being connected to be driven by the shaft of the motor M1. The brake BK is at times energized, in a manner to be described, to hold the motor M1 in an adjusted position, and the tachometer generator TG functions in a conventional manner to provide damping in the control of the motor M1. The control circuits for these units will be described in more detail below, in connection with FIGS. *5a* through *5d*.

Also connected to the drive gear 47 are a series of transducers Y1, Y2, Y3 and Y4, which may be control transformers, of the type well known in the art, which are provided with wound rotors and wound stators, and which produce a voltage in one of the wound elements in response to energization of the other that is a function of the position of the shaft. Thes transducers are successively connected to the motor drive shaft 51 by means which renders them progressively more sensitive to movement of the rotation of the lead screw 31. Specifically, the transducer Y4 has its rotor shaft connected to a gear 53 which is driven by the gear 47, the gears 47 and 53 being related such that the smallest increment of travel of the stop 37 to be measured, such as 0.0001 inch, corresponds to slightly less than one-half revolution of the rotor of the transducer Y4. As shown, the stator of the transducer Y4 is mechanically connected to the housing 19.

Reducing gears 54, 55 are connected between the rotor of the transducer Y4 and the rotor of the transducer Y3, the stator of the transducer Y3 being connected to the housing 19. The ratio of gears 54 and 55 is selected such that one revolution of the gear corresponds to one-tenth of a revolution of the rotor of the transducer Y3. The rotor of the transducer Y3 is connected to the rotor of the transducer Y2, through gears 57 and 59, which are so related that one revolution of the rotor of the transducer Y3 will produce one-tenth of a revolution of the rotor of the transducer Y2. The stator of the transducer Y2 is connected to the casing 19. The rotor of the transducer Y2 is connected through gears 61 and 63 to the rotor of the transducer Y1, the stator of which is connected to the casing 19. The ratio of the gears 61 and 63 is preferably chosen so that one revolution of the rotor of the transducer Y2 will produce one-tenth of a revolution of the rotor of transducer Y1. It will be apparent to those skilled in the art that the suggested ratios are merely for convenience in working with a decimal number system, and that other ratios could equally well be employed without departing from the scope of my invention in its broader aspects. The overall gear ratios are chosen such that the total range of travel of the lead screw 37 corresponds to somewhat less than one-half of a revolution of the transducer Y1, in apparatus in which the transducers are of the control transformer type having an inherent ambiguity if used over an angle of rotation greater than 180 degrees.

Figure 3:
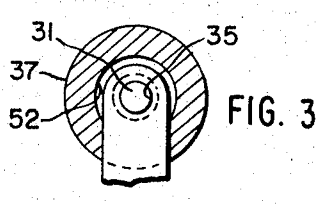
FIG. 3 is a fragmentary sectional view of a movable stop in FIG. 2, taken along the line 3—3 in FIG. 2, looking in the direction of the arrows.

Referring now to FIG. 4, I have shown a block diagram of the apparatus of my invention for controlling the turret 15 and the stop 37. This apparatus corresponds to the block diagram of FIG. 1, and incorporates certain of the elements discussed in connection with FIGS. 2 and 3, together with other elements to be described. Briefly, the apparatus of my invention is arranged for manual operation by manipulating five numerical position input switches D1 through D5, one of eight tool correction potentiometers P1 through P8, a pushbutton PB, and a function switch F1, the state of operation of the system being indicated by the energized or de-energized condition of an indicator lamp E5K. As indicated in FIG. 4, the function switch is provided with at least three positions, including an Off position, a position T in which the turret is controlled, and a position S in which the stop 37 is set. In the illustrative embodiment of the invention, the turret 15 has eight operating positions, in which any of eight tools may be placed in operating relationship with respect to a workpiece mounted in the chuck 17. In operation, with the function switch in the Off position, the switch D1 is set to one of eight of its ten positions corresponding to the selected turret position. The function switch is then moved to its T position, and the pushbutton PB is depressed a number of times. After each actuation of the pushbutton PB, the counter is advanced two steps, and a turret positioning operation takes place which involves transfer of the selected position from the switch D1 to a group of relays, from which the information is used to control the turret control mechanism to position the turret 15 to the selected station. During positioning, the indicator lamp E5K will be lit, and the operator must wait until it is extinguished before continuing the operation of the system by actuating the pushbutton PB. If the pushbutton PB is actuated while the lamp E5K is lit, it will be ineffective, as will appear. After the turret has been positioned, information in the A relays will be removed, and the switches D1 through D5 may be set with the digits of a desired position of the stop with respect to a selected index. For example, switch D1 may be set to the highest ordered digit, and the switches D2, D3, D4 and D5, respectively, may be set to successively low ordered digits. Thus, if it were desired to position the stop 1.5324 inches from its reference or zero position, the switches D1 through D5 would be set respectively to their first, fifth, third, second and fourth positions. Thereafter, operation of the function switch to its S position would be followed by successive actuations of the pushbutton PB, waiting between each actuation at which the indicator lamp E5K is lit until it has become extinguished. During this operation, the numerical digits stored in the switches D1 through D5 are successively transfered to A relays and B storage relays, in a manner to be described, which supply information to the stop control servomechanism under the control of the counter, to position the stop 37 in successively finer steps until its final position has been reached. During this operation, the appropriate tool correction potentiometer P1 through P8 will supply a correction to the instructed position which can be used to take into account tool wear or misalignment, and the tool correction unit will automatically supply a correcting adjustment for temperature. The manner in which the apparatus just generally described in connection with FIG. 4 is constructed, and the manner in which it operates, will next be considered in more detail in conjunction with the detailed circuits shown in FIGS. *5a* through *5d*.

Referring now to FIG. *5a*, the program control of my invention comprises a group of program control relays B and a group of sequencing relays E. In general, the number of relays in these groups will depend on the number of functions to be programmed. In the illustrative embodiment here shown, two program control relays B7 and B9, and six sequencing relays E1, E2, E3, E4, E5 and E6 are employed. These relays are controlled in a manner to be described in response to the position of the function switch S1, actuation of the pushbutton PB, and the state of a counter, here shown as comprising eleven counter relays C1, C2, C3, C4, C5, C6, C7, C8, C9, C10 and C11. With the function switch S1 in its Off position, the relays are in the condition shown, with the relay E3 energized and the remaining relays de-energized. These relays are illustrated in a conventional manner with armatures conventionally shown by a line inclined downwardly for a de-energized relay and horizontal for an energized relay. The armatures are assigned letters, and are in some instances shown directly beneath the block indicating the winding of the relay, and in other instances are shown elsewhere in the circuit for convenience, being identified by the reference character of the relay and a distinguishing letter for the armature. Contacts closed in the energized position of the relay are shown above the armatures, and contacts closed in the released position of the relay are shown below the armature. Sources of voltage are shown conventionally by terminals B and N, representing the positive and negative terminals, respectively, of a suitable battery or other conventional voltage source. All diodes shown are employed for isolation, to prevent sneak circuits in the manner known in the art, and their functions will not be described in detail.

The relay B7 is operative with the function switch S1 in its S position. In this position of the function switch, the relay B7 has a pickup circuit extending over front contact *b* of the relay E2 and back contact *c* of the relay E6. The relay B7 has a holding circuit which extends from terminal B of the battery over back contact *b* of the relay C11, and its own front contact *a*.

The relay B9 is operative in the T position of the function switch S1. In this position of the function switch, the relay B9 has a pickup circuit extending from terminal B of the battery over front contact *c* of the relay E2 and front contact *b* of the relay E6. A common holding circuit is provided for the relay B9 which extends from terminal B of the battery over back contact *c* of the relay C4 and its own front contact *a*.

The relay E1 has a pickup circuit which extends from terminal B of the battery over the contacts of a spring-returned normally open pushbutton PB, over a back contact *c* of a relay E5, to be described, through a surge-limiting resistor R and a timing capacitor C, and thence through the winding of the relay E1 to terminal N of the battery. The capacitance of capacitor C is chosen such that when the pushbutton PB is manually depressed, sufficient current will flow through the capacitor C and the winding of the relay E1 to ensure the closing of front contact *a* of the relay E1 before the capacitor is sufficiently charged so that the current becomes insufficient to hold up the relay. The time delay thus provided is determined by the capacitance of the capacitor C in conjunction with the impedance of the relay E1, and is selected to be short with respect to the time in which the pushbutton PB can be manually pushed down and released. This form of pickup circuit renders the operation of the relay E1 uniform and essentially independent of the time of actuation of the pushbutton PB. As will appear, the relay E5 is picked up when the system is unbalanced, to prevent premature actuation of the sequencing circuits by the pushbutton PB.

As shown, a holding circuit for the relay E1 is provided which includes back contact *a* of the relay E2 and its own front contact *a*.

The relay E2 is a front contact repeater of the relay E4, and is provided with a single pickup circuit extending over the front contact *a* of the relay E4. The relay E4 is a back contact repeater of the relay E3, which in turn is a back contact repeater of the relay E1. As indicated by the shaded portion at the bottom of the blocks indicating the coils of these relays, both relays E3 and E4 are slow to release which may be accomplished in any conventional manner, as by connecting a suitable resistor and capacitor in series across the windings of the relays.

The relay E6 has a pickup circuit including front contacts *e* of the relays B7 and B9 in parallel. A holding circuit for the relay E6 is provided which includes front contact *c* of the relay C1 and its own front contact *a*.

The counter relays C1 through C11 are connected in a conventional counting sequence, modified to respond correctly to the sequence of actuation of the relays E1 through E4 and B7 through B9. As shown, each of the relays C2 through C11 is provided with a pickup circuit which includes a front contact of the preceding relay in the sequence and either a front or a back point of contact *c* of relay E2. Specifically, the pickup circuits for the relays C2, C4, C6, C8 and C10 include front contact *c* of the relay E2, and those for the relays C3, C5, C7, C9 and C11 include back contact *c* of relay E2.

The relay C1 is provided with a pickup circuit which includes front contact *a* of relay B8 and front contact *c* of relay E1. It is also provided with a holding circuit, which includes front contact *b* of relay E2 and back contact *e* of relay E1 in parallel, and its own front contact *a* in series with these contacts.

The relays C2 through C11 are provided with holding circuits which include their own front contacts, front contact *c* of relay C1, and, except for the relay C11, other contacts of higher relays in the series. Specifically, the holding circuit for relay C2 includes its own front contact *a* and the back points of contacts *a* of relays C3, C5, C7, C9 and C11, together with front contact *c* of the relay C1. The holding circuit for relay C3 is the same except that it includes its own front contact *a* and interrupts the holding circuit for the relay C2. The other circuits are similar; it will be seen that the completion of the holding circuits of the relays C4, C6, C8 and C10 do not interrupt the holding circuits for preceding relays, and that the holding circuits for the relays C2, C5, C7, C9 and C11 do interrupt the holding circuits for previous relays.

Figure 5A:
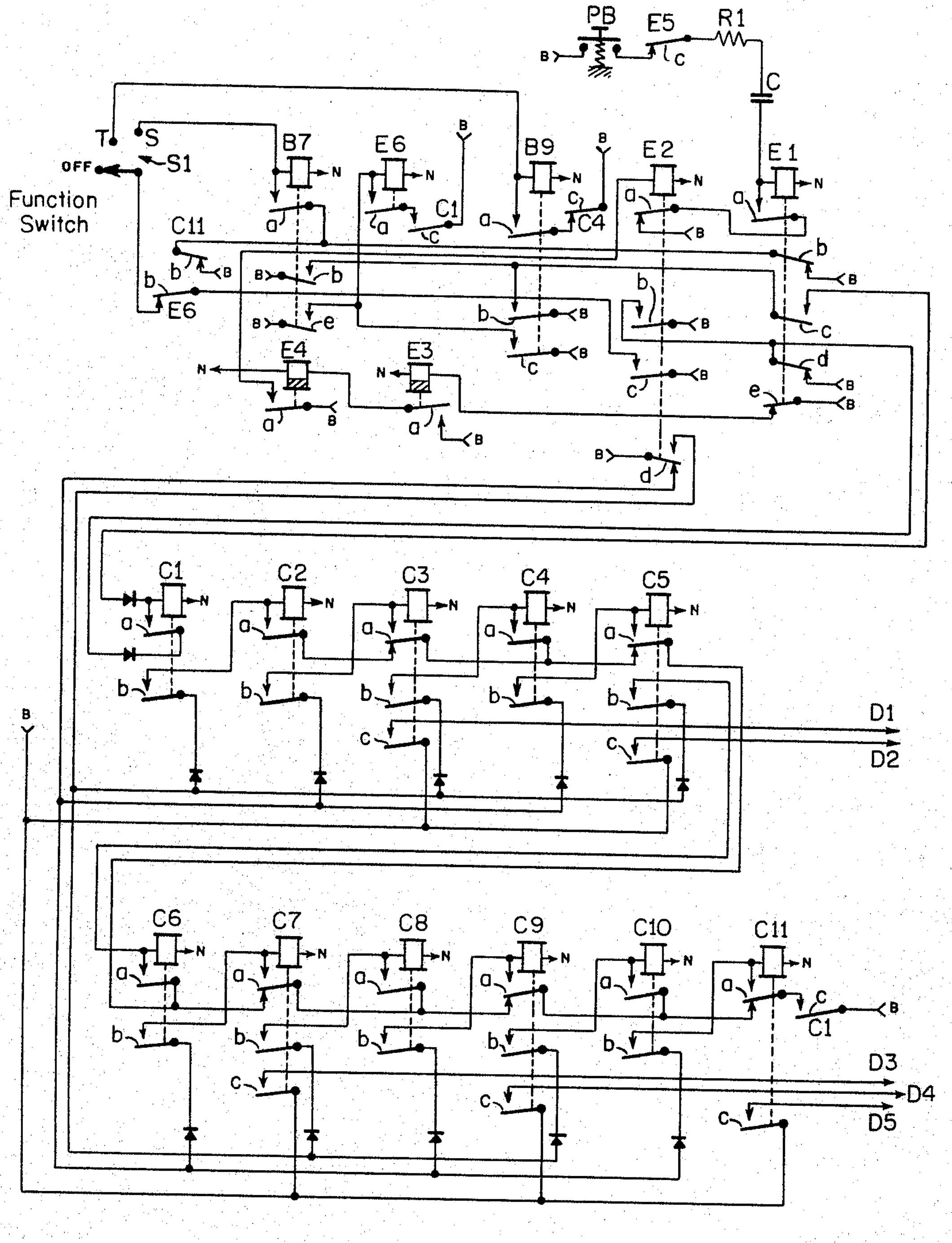
Figure 5B:
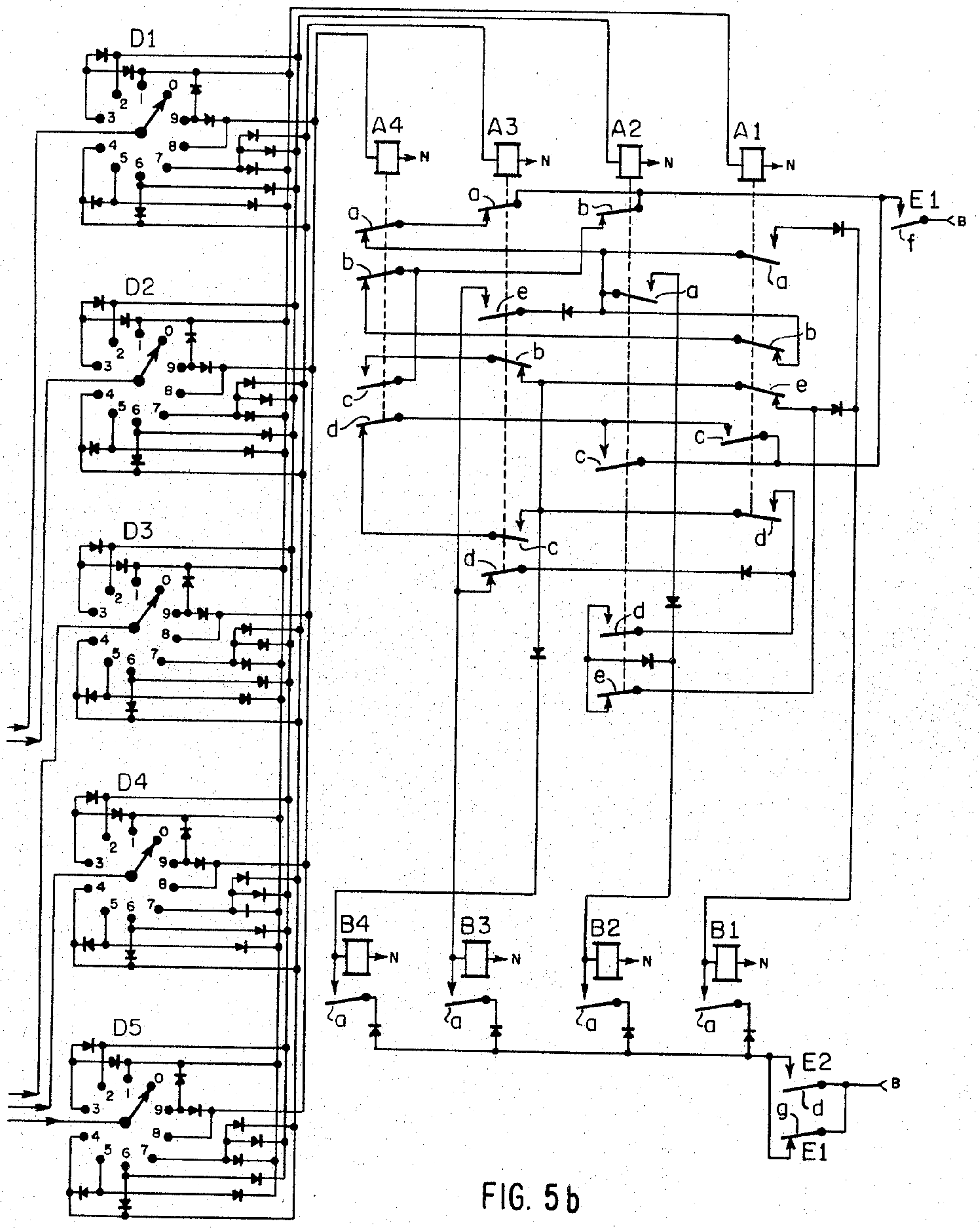

Referring now to FIG. 5*b*, I have shown the manner in which the numerical input switches D1 through D5 are connected. Each of these switches has ten positions labeled from zero through 9, and is adapted to insert one digit of a position address for the element to be controlled. In each position of each of these switches, connections are made to control relays A1, A2, A3 and A4 to a state representing in binary decimal code the digit corresponding to the position in which the switch is set. These states are shown in Table I below for the switch D1, and the same circuits are provided for the switches D2 through D5, isolation being provided by diodes as shown.

TABLE I

| Switch Position | A4 | A3 | A2 | A1 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

In Table I, a zero represents a de-energized relay, and a 1 represents an energized relay. Selection of the switch which is effective at a given time to operate the relays A1 through A4 is provided by contacts of the relays C3, C5, C7, C9 and C11, each of which selects a particular switch for connection to the A relays when energized. Specifically, energization of the relay C3 closes its front contact *c* to energize the arm of the switch D1, causing it to set the A relays to a combination of states corresponding to its position. For example, with the relay C3 energized, and the switch D1 set to its seventh position, the relays A1, A2 and A3 would be energized, and relay A4 would be released. Similar considerations apply to the switches D2 through D5, which are successively selected by the successive and mutually exclusive energization of the relays C5, C7, C9 and C11.

The information stored on the A relays may be transferred to a set of B storage relays B1, B2, B3 and B4 by means of circuits closed when the relay E1 is energized. For purpose to appear, the B relays are not simply made front contact repeaters of the corresponding A relays, but are set to states corresponding to the states of the A relays in a different code. The relationship between states of the A relays and states of the B relays is shown in Table II below.

TABLE II

| A4 | A3 | A2 | A1 | B4 | B3 | B2 | B1 |
|---|---|---|---|---|---|---|---|
| 0 | 0 | 0 | 0 | 0 | 0 | 0 | 0 |
| 0 | 0 | 0 | 1 | 0 | 0 | 0 | 1 |
| 0 | 0 | 1 | 0 | 0 | 0 | 1 | 0 |
| 0 | 0 | 1 | 1 | 0 | 0 | 1 | 1 |
| 0 | 1 | 0 | 0 | 0 | 1 | 0 | 0 |
| 0 | 1 | 0 | 1 | 1 | 0 | 0 | 0 |
| 0 | 1 | 1 | 0 | 1 | 0 | 0 | 1 |
| 0 | 1 | 1 | 1 | 1 | 0 | 1 | 0 |
| 1 | 0 | 0 | 0 | 1 | 0 | 1 | 1 |

As shown in Table II, the relays B1 through B4 follow the operation of the relays A1 through A4 up through binary 4. At binary 5 and continuing through binary 9, relays B1, B2 and B3 recycle through binary zero through 4, while relay B4 remains up. It is believed unnecessary to describe the pickup circuits for the relays B1 through B4 by which this operation is obtained, since such circuits are well known to those skilled in the art and are shown in detail in the drawings. In general, all these pickup circuits include front contact *f* of the relay E1, and each includes appropriate front or back contacts of the relays A1 through A4 to cause it to be picked up in the appropriate combinations of the A relays. As mentioned above, isolating diodes are employed where needed to reduce the number of contacts required for the code conversion. The B relays have holding circuits, each including in parallel front contact *d* of relay E2 and back contact *g* of relay E1, and front contact *a* of the B relay.

Figure 5C:
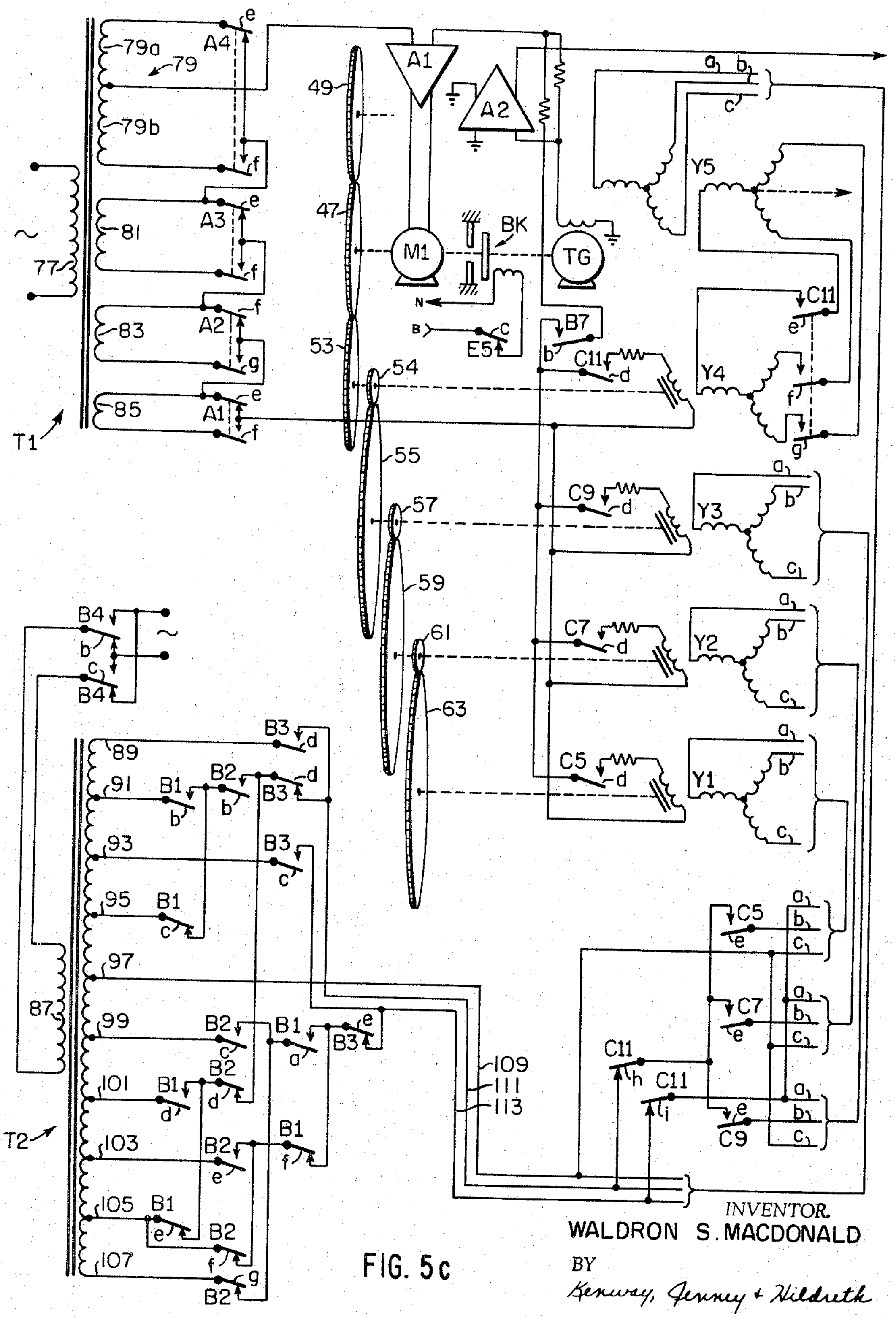

Referring now to FIG. 5*c*, the control circuit for the servomotor M1 will next be described. The servomotor M1 may be a conventional two-phase electric motor having one phase continually energizing and a second phase adapted to be energized by a voltage of a first or an opposite phase to cause the motor to rotate in one direction or an opposite direction, respectively, at a speed dependent on the magnitude of the voltage. A conventional amplifier A1 is provided for energizing the controlled phase of the servomotor M1. The amplifier A1 has a control circuit which includes in series a winding of one of the control transformers Y1, Y2, Y3 or Y4 selected by an energized one of the counter relays C5, C7, C9 and C11, and a combination of secondary windings of a transformer T1 selected by the digit of the instructed position of the control element stored on the A relays.

The transformer T1 is provided with a primary winding 77 arranged to be energized by a conventional source of alternating voltage, such as a 120 volt 60 cycle source, and four secondary windings 79, 81, 83 and 85. The secondary winding 79 is tapped as shown, and this tap provides one input line for the amplifier A1. Basically, the windings 79 through 85 are arranged in a binary sequence, with the winding of 79 being provided with eight turns for four turns of the winding 81, two turns of the winding 83, and one turn of the winding 85. In practice, the tap on the winding 79 may be somewhat off center to provide a desired set of null positions in a particular amplifier-motor combination. However, this refinement may be kept in mind without introducing it as a complication into the explanation of the apparatus, which is simply that, in the successive binary states of the relays A1 through A4, a successively larger voltage is provided in series with the control circuit of the amplifier A1. Specifically, combinations of the secondary windings are included in the control circuit of the amplifier A1 in various states of the A relays as shown in Table III below. It will be apparent that the voltage increases by one unit at each step in the sequence of the relays A1 through A4. This voltage is inserted in series with one of the rotors of the control transformers Y1, Y2, Y3 and Y4 selected by the actuated one of the counter relays C5, C7, C9 and C11.

TABLE III

| A4 | A3 | A2 | A1 | 79a | 79b | 81 | 83 | 85 | Relative Voltage |
|---|---|---|---|---|---|---|---|---|---|
| 0 | 0 | 0 | 0 | 1 | 0 | 0 | 0 | 0 | −4 |
| 0 | 0 | 0 | 1 | 1 | 0 | 0 | 0 | 1 | −3 |
| 0 | 0 | 1 | 0 | 1 | 0 | 0 | 1 | 0 | −2 |
| 0 | 0 | 1 | 1 | 1 | 0 | 0 | 1 | 1 | −1 |
| 0 | 1 | 0 | 0 | 1 | 0 | 1 | 0 | 0 | 0 |
| 0 | 1 | 0 | 1 | 1 | 0 | 1 | 0 | 1 | +1 |
| 0 | 1 | 1 | 0 | 1 | 0 | 1 | 1 | 0 | +2 |
| 0 | 1 | 1 | 1 | 1 | 0 | 1 | 1 | 1 | +3 |
| 1 | 0 | 0 | 0 | 0 | 1 | 0 | 0 | 0 | +4 |
| 1 | 0 | 0 | 1 | 0 | 1 | 0 | 0 | 1 | +5 |

The control transformers Y1 through Y4 may be of the conventional type in which a wound single-phase rotor is provided, together with a wound three-phase stator. As is known in the art, a control transformer of this type will produce an output voltage which is a function both of the energization of its windings and the position of its rotor shaft. In the illustrated embodiment of my invention, I have provided apparatus for supplying a voltage on the stator of the selected control transformer corresponding to a rotor shaft null position which will be in accord with the selected position digit stored on the B relays. For this purpose, I have provided a transformer T2 having a primary winding 87 which is adapted to be energized in a first phase or an opposite phase from a conventional source of AC voltage, such as a 120 volt 60 cycle source, depending on the condition of the relay B4. With relay B4 de-energized, a first phase in phase with the field winding on the servomotor M1 is applied to the primary winding 87, and with the relay B4 energized, an opposite phase voltage is applied.

The transformer T2 is provided with a secondary winding having a plurality of taps 89 through 107, two of which are selected for each state of the relays B1 through B4 to apply voltages of selected phase and magnitude to terminals 109, 111 and 113. Table IV below shows the manner in which the connections are made for each of the ten states of the B relays. It will be noted that the output lead 109 is permanently connected to the tap 97 and that the connections to terminals 111 and 113 depend on the state of the B relays. The relative phase and magnitude of the voltage applied to the two terminals 111 and 113 with respect to the terminal 109 in the different states of the B relays are also indicated in Table IV. In Table IV, the voltages measured from terminals 111 to 109 and from terminal 113 to terminal 109 are indicated in terms of the relative number of windings of the secondary transformer T2 which are connected between the terminals, with an upward arrow indicating that the voltage is of one phase, and a downward arrow indicating that the voltage is of an opposite phase.

TABLE IV

| B4 | B3 | B2 | B1 | Terminal connected to 111 | Terminal connected to 113 | Applied Voltages | |
|---|---|---|---|---|---|---|---|
| | | | | | | 111–109 | 113–109 |
| 0 | 0 | 0 | 0 | 105 | 105 | 4↓ | 4↓ |
| 0 | 0 | 0 | 1 | 101 | 107 | 2↓ | 5↓ |
| 0 | 0 | 1 | 0 | 95 | 103 | 1↑ | 3↓ |
| 0 | 0 | 1 | 1 | 91 | 99 | 3↑ | 1↓ |
| 0 | 1 | 0 | 0 | 89 | 93 | 4↑ | 2↑ |
| 1 | 0 | 0 | 0 | 105 | 105 | 4↑ | 4↑ |
| 1 | 0 | 0 | 1 | 101 | 107 | 2↑ | 5↑ |
| 1 | 0 | 1 | 0 | 95 | 103 | 1↓ | 3↑ |
| 1 | 0 | 1 | 1 | 91 | 99 | 3↓ | 1↑ |
| 1 | 1 | 0 | 0 | 89 | 93 | 4↓ | 2↓ |
| 1 | | | | | | | |

It will be apparent that when relay B4 picks up during states 5 through 9, all of the phases of the voltages on the output leads 109 through 113 are reversed with respect to the phase of the servomotor field winding. Thus, ten discrete states are provided in each of which a different resultant voltage vector is provided by the stator of the selected control transformer. These voltage vectors are selected to correspond to ten rotor nulls 36 degrees apart. Ten positions selected by the state of the A relays are provided, corresponding to positions 3.6 degrees apart. These positions are selected by voltages from the secondary winding of the transformer T1 determined by the state of the A relays and introduced in series with the voltage from the rotor of the selected control transformers Y1–Y4 in the control circuit for the amplifier A1. In combination with the voltages applied to the rotor of the selected control transformer, and the voltage inserted by the selected portion of the secondary winding of the transformer T1, it will be apparent that a unique and different point of balance for the amplifier A1 will be provided for each set of digits applied and stored in relays A1 through A4 and B1 through B4. The amplifier will accordingly be energized to drive the motor M1 to position the rotor of the selected control transformer until a balance is reached. The increments of voltage selected by the B relays are selected to produce for each increment a shaft rotation of the servomotor M1 ten times the rotation produced by the increments of voltage selected by the A relays. As will appear, the highest ordered position digit is supplied to the B relays at each step in the adjustment of the stop 37.

An amplifier A2 is connected across the output terminals of the tachometer generator TG to produce an isolated output voltage in accordance with the speed of the output shaft of the motor M1. This amplifier A2 has its output terminals connected in series with the winding of a relay E5, such that relay E5 is energized at any time when the amplifier A2 produces an output voltage beyond a selected minimum threshold value. The relay E5 is provided with a front contact *b* which when closed energizes the indicator lamp E5K referred to above, providing an indication that the positioning operation currently being performed is not completed and that the pushbutton PB should not be depressed. The relay E5 is also provided with the front contact *c*, described above, in circuit with the pushbutton PB to render it ineffective until the system is balanced. The control of the relay E5 from the tachometer generator output is preferable to control from the output of the servomotor amplifier A1, because the latter may produce a residual output voltage under some conditions, even though the servomotor M1 is stopped, as long as there is no net output voltage component having the proper phase to drive the motor in one direction or the other. The tachometer generator output provides a positive indication that the motor shaft is stationary.

Figure 5D:
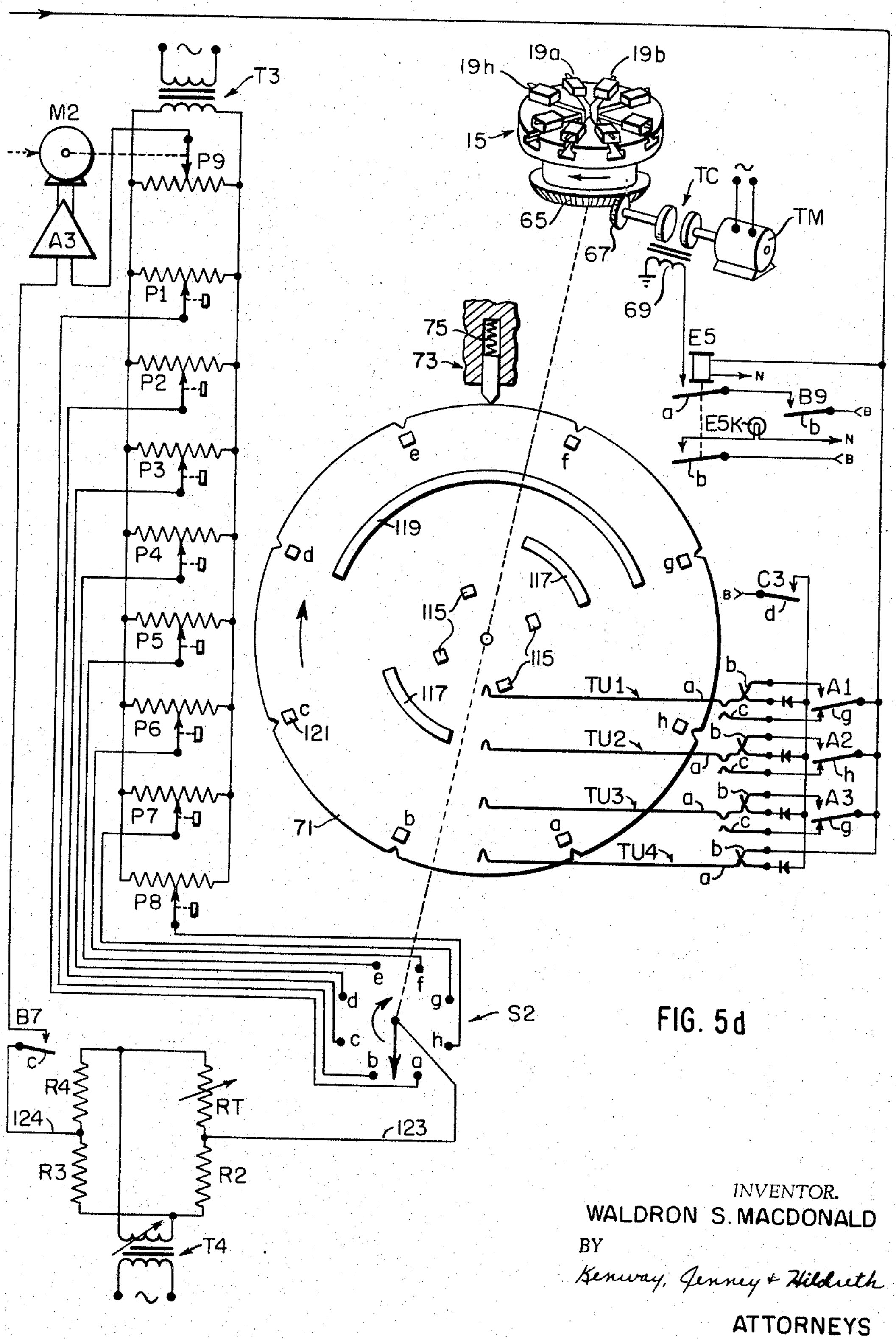

Referring now to FIG. 5*d*, the turret 15 is schematically shown as provided with a drive gear 65 connected through a beveled gear 67 for rotation in the direction indicated by the arrows about a central axis. The gear 67 is arranged to be driven through a turret clutch TC by a normally energized and rotating electric motor TM. The clutch TC may be of the conventional electromechanical type which is engaged by energization of an electromagnetic coil 69.

Also carried by the turret 15 and rotating about the same axis as the gear 65 is a cam plate 71 which cooperates with a plurality of switches TU1, TU2, TU3 and TU4 to control the operation of the clutch TC. As indicated schematically by the notches on the cam plate 71, index positions may be provided at each of eight selected positions *a* through *h* of the turret 15 in which one of the tools 19 is in position, and a mechanical detent, as schematically indicated at 73, may be employed to position the turret exactly at a selected one of these rotated positions when the clutch TC is de-energized. As schematically indicated, the detent 73 may be resiliently engaged, as by a spring 75, so that it may be overridden when the turret clutch is engaged.

The cam plate 71 is illustrated in the manner shown for convenience only, as will be apparent to those skilled in the art; the cams to be described could equally well be all at the same radius and distributed over the surface of a cylinder in a conventional manner. However, as shown, each of the switches TU1 through TU4 is normally closed in the position shown, and is adapted to be closed in an opposite position, or opened as in the case of switch TU4, when engaged by an associated raised cam surface on the plate 71. Specifically, raised portions 115 cooperate with the switch TU1 to disengage its contacts *a* and *b* and to engage its contacts *a* and *c* at positions *a, c, e* and *g* of the turret. Raised cam surfaces 117 cooperate with the switch TU2 to open its contacts *a* and *b* and engage its contacts *a* and *c* in positions *b, c, f* and *g*, and intermediate positions. The cam surface 119 cooperates with the switch TU3 to open its contacts *a* and *b* and engage its contacts *a* and *c* in positions *d* through *g* and intermediate positions. A cam projection such as 121 is provided at each of the turret positions to open the switch TU4.

The switches TU1–TU4 are interconnected with contacts *g* of the relays A1 and A3 and *h* of the relay A2 as shown, in such a manner that in each of the eight different states of the relays A1 through A3, corresponding to a selected turret position from *a* to *h*, a circuit will be completed from terminal B of the battery over front contact *b* of the relay C3, at least one of the turret switches TU1 through TU4, and at least one of the contacts of the relays A1, A2 and A3 except when the cam plate 71 is rotated to the selected position. This circuit is employed to energize the relay E5. When energized, the relay E5 completes a circuit over front contact *b* of the relay B9, its own front contact *a*, and the winding 69 of the turret clutch TC. Thus, at any except a position selected by the A relays when the relay C3 is closed, the turret clutch will be operated to rotate the turret until it is in the selected position, at which time the control circuit for the relay E5 will be interrupted and the turret clutch will be de-energized. The lamp E5K will be lit during this period, and extinguished when the turret is in position, so that the operator will know when the next operation can be carried out.

An eight-position switch S2 is also arranged to be driven by the turret clutch, and its eight positions *a–h* each correspond to a corresponding position of the turret. In each position, one of a plurality of potentiometers P1 through P8 is selected for connection into the control circuit of a conventional servomotor amplifier A3. This amplifier has output terminals connected to the controlled phase conventional servomotor M2, which may be of the same construction as the servomotor M1. The servomotor M2 has an output shaft connected to drive the wiper of a follow-up potentiometer P9, and also connected to drive the rotor of a differential control transformer Y5 (FIG. 5*c*). The differential control transformer Y5 may be of the conventional type provided with three-phase wound stator and rotor, and adapted to produce a control voltage across the output terminals of either the stator or the rotor when the other terminals are energized with a voltage of a predetermined phase proportional to the rotor angle and a magnitude proportional to the magnitude of the energizing voltage.

Also included in the control circuit of the amplifier A3 is a bridge circuit comprising three fixed resistors R2, R3 and R4 and a fourth temperature-responsive resistor RT. The temperature-responsive resistor is mounted on a selected portion of the machine, as by being clamped to the carriage 7, to respond to the temperature of the lathe as affected by the ambient temperature. It will be apparent to those skilled in the art that the voltage produced across the leads 123 and 124 in response to energization by the secondary winding of the transformer T4 will depend on the resistance of the resistor RT. The resistor RT is selected such that in a reference temperature condition, such as 75° F., the bridge will be balanced and no output voltage will be produced. As the temperature varies above or below this selected value, however, a voltage component is produced across the leads 123 and 124 which is added in series with the voltage produced by the bridge comprising the selected potentiometers P1 through P8 and the follow-up potentiometer P9 to control the operation of the amplifier A3. Temperature sensitivity may be adjusted by making the transformer T4 variable, as indicated in FIG. *5d*.

The amplifier A3 will control the servomotor M2 to adjust the potentiometer P9 to balance the voltages introduced by the selected potentiometers P1 through P8 and the bridge comprising the resistor RT.

Each of the potentiometers P1 through P8 is provided with a graduated dial which may be adjusted by an operator to insert a correcting factor for an associated one of the eight tools 19 which is selected in a given turret position. In practice, if the machine is designed to produce a tolerance of plus or minus one-ten-thousandth of an inch, each of the potentiometers P1 through P8 is provided with a sufficient range of adjustment so that a total movement of plus or minus three-thousandths of an inch may be added by way of compensation. Since it is an easy matter for a relatively untrained operator to adjust a part to within three-thousandths of an inch, the ease with which work can be done to one-ten-thousandth of an inch without increasing the required skill of the operator will be readily appreciated.

As shown in FIG. *5d*, in any selected position of the turret 15, the switch S2 is closed in a position to place the wiper of one of the potentiometers P1 through P8 in series with the bridge comprising the temperature-responsive resistor RT. For example, if potentiometer P1 is selected in position *a* of the switch S2, a bridge is formed comprising the potentiometer P1 and the potentiometer P9 connected across a normally energized transformer T3, which bridge is placed in series with the bridge comprising resistor RT to control the amplifier A3. The control circuit for the amplifier is closed only when the relay B7 is energized and closes its front contact *c*.

When the relay C11 is energized, its contacts *e*, *f* and *g* are closed, placing the rotor of the control transformer Y5 in parallel with the stator of the control transformer Y4. At the same time, voltages on the leads 109, 111 and 113 from the transformer T2 are applied to terminals *a*, *b* and *c* of the stator of the control transformer Y5. This voltage will be transmitted to the stator of the control transformer Y4 by the rotor of the control transformer Y5, and the field vector will be rotated in phase by an amount determined by the rotated position of the rotor of Y5. In other words, the position in which the servomotor M1 will come to rest will be determined basically by the digits stored on the A and B relays and controlling the transformers T1 and T2, but a correction will be imposed by the rotated angle of the rotor of the control transformer Y5 which takes into account temperature variations from the reference temperature and manually inserted corrections for variations due to tool wear and misalignment from the initially set positions.

Having described the structure of the preferred embodiment of my invention, its operation under typical conditions will next be described. It will be assumed for purposes of illustration that it is desired to bore a hole in a workpiece fastened to the chuck 17 of the lathe shown in FIG. 2 with a boring tool 19*a* attached to the turret 15. The depth of the cut will be assumed to be referenced to a face plate of the chuck 17 transverse to the spindle axis, and it will be assumed for the purpose of illustration that it is desired to stop the boring tool 1.5324 inches from the face plate. It will also be assumed that the tool 19*a* is subject to wear at such a rate that it is desired to impose a correction of two ten-thousandths of an inch on the instructed stop position. The apparatus will be assumed to be in the condition shown, and operation will thereafter proceed as follows:

As the first step, the switch D1 in FIG. *5a* is set to its position 1, to cause the turret to be set to its position *a*. At the same time, or at any later time prior to the actual final positioning of the stop, the potentiometer P1 may be adjusted to apply the two ten-thousandths of an inch correction. Next, the function switch S1 will be set to position T. The relays in the circuit will at this time be in the condition shown at the left side of the chart in FIG. 6.

The turret setting operation is next commenced by momentarily depressing the pushbutton PB. The relay E1 will now pick up, and complete its holding circuit over back contact *a* of the relay E2. With the relay E1 picked up, the pickup circuit for the relay E3 will be interrupted and it will release after its predetermined time delay. When it does release, the relay E4 will be immediately picked up, causing the relay E2 to pick up as shown in FIG. 5. With relay E2 picked up, the holding circuit for the relay E1 will be interrupted, and the relay E1 will release, causing the relay E3 to pick up again. The relay E4 will now begin its timed release. During the time that the relay E2 is energized, its front contact *b* will be closed and will pick up the relay B9 over terminal T of the switch S1. This relay will remain energized over its holding circuit including back contact *c* of the relay C4. When the relay E4 releases, the relay E2 will also be released.

The circuit will now be stable in the state shown in FIG. 6 until the pushbutton PB is again momentarily depressed. This will cause the relay E1 to pick up again, and the previous cycle will be repeated. When the relay E1 first picks up, an energizing circuit will be completed for the counter relay C1 over front contact *c* of the relay E1 and front contact *b* of the relay B9.

When the relay E2 is picked up, it will complete a holding circuit for the relay C1 over its own front contact *b*, and will also complete a circuit over its own front contact *c*, and front contact *b* of the relay C1 to energize the relay C2. When the relay C2 picks up, it will complete its holding circuit and will remain energized until the relay C3 is energized. When the relay E2 is released during the cycle, the relay C3 will be picked up over back contact *c* of the relay E2 and front contact *b* of the relay C2. Energization of the relay C3 will interrupt the holding circuit for the relay C2, whereupon this relay will drop away.

With the relay C3 picked up, the control circuit for the turret including the turret contacts TU1 through TU4 and contacts *g* of the relays A1 and A3 and *h* of the relay A2 will be completed and the relay E5 will be picked up until the turret is in its position *a*. When the relay E5 picks up, the circuit for the turret clutch TC will be completed over front contact *b* of the relay B9 and front contact *a* of the relay E5. The turret clutch will then be engaged until the turret reaches position *a*, at which time the control circuit for the relay E5 will be interrupted and it will release. The detent 73 will operate to index the turret exactly to its position *a*.

Specifically, when relay C3 is picked up, its contact *c* will be closed and a circuit will be completed over this contact and the arm of the switch D1 in its 1 position through the winding of the relay A1, causing it to be energized. The relays A2, A3 and A4 will remain released. In this condition, referring to FIG. *5d*, with front contact *g* of relay A1 closed and front contacts *h* and *g* respectively, of the relays A2 and A3 released, a circuit will be completed for energizing the relay E5 until the turret reaches its position *a*, at which time the circuit over the front contact *g* of the relay A1 will be interrupted at the open contact *b* of the switch TU1. Engaged contacts *b* of the switches TU2 and TU3 will be connected to open front contacts *h* and *g* of the relays A2 and A3, respectively. The switch TU4 will be open. Accordingly, the relay E5 will release.

While the relay E5 is energized, the lamp E5K will be illuminated, and the operator must wait until it is extinguished before proceeding. When it is extinguished, the pushbutton PB may again be depressed to cause the rest of the operating cycle shown in FIG. 6 to take place.

When the relay E2 picks up in the cycle, the relay C4 will be picked up. At the same time, before the relay E1 closes its back contacts, the pickup circuit for the relay C1 will be interrupted and the relays C1 and E6 will be released, causing the relays C3 and C4 to be released. With the relay C4 temporarily picked up, the holding circuit for the relay B9 will be interrupted, and this relay will be released. The relay C5 may be very briefly energized at this time, but will not pick up. The circuits are now in their initial condition.

After the turret setting operation is completed, the switches D1 through D5 are next set to their first, fifth, third, second and fourth positions, respectively, in accordance with the setting of 1.5324 inches selected for illustration. Referring now to FIG. 7, together with FIG. 5*a*, operation will then proceed by setting the function switch S1 to its S position. As the pushbutton PB is successively depressed, the operation shown in FIG. 7 will proceed with the counter relays C3, C5, C7, C9 and C11 progressively being energized. When the counter relay C3 is picked up, the digit 1 on the switch D1 will be transferred to the relays A1 through A4 in the manner previously described.

Thereafter, following a subsequent operation of the pushbutton PB, when the relay E1 is next picked up, it will close its front contact *f* and the digit 1 will be transferred to the B relays B1 through B4. Following the next operation of the pushbutton PB, the relay C5 will pick up and close its front contact *c*, and the relay C3 will be released. The digit 5 stored on the switch D2 will then be transferred to the A relays. At this time, the A relays store the first digit of the selected position and the B relays store the second position.

Referring now to FIG. 5*c*, the digit 1 stored on the B relays will cause appropriate terminals and secondary windings of the transformer T2 to be connected across the stator of the control transformer Y1. The digit 5 stored on the A relays will cause appropriate voltages from the secondary windings of the transformer T1 to be connected in series with the rotor of the control transformer Y1 in the operating circuit for the amplifier A1. The amplifier A1 will then operate the motor M1 until the stop 37 has been positioned to a point at which it will stop the tool 19*a* 1.5 inches from the face plate. During this time, the relay E5 will be energized and the indicator lamp E5K will be illuminated.

When the balancing operation has ceased, pushbutton PB may again be depressed, with the result that the digit 5 will be transferred to the B relays and the next digit 3 will be transferred to the A relays. The servomotor control circuit will again be unbalanced, with the rotor of the control transformer Y2 in circuit with the amplifier A1, and the stop will be positioned to 1.53 inches. Following a subsequent operation of the pushbutton PB, the digits 3 and 2 will be supplied to the B and A relays, respectively, and the stop will be positioned to 1.532 inches.

The apparatus is now in condition for the setting of the final digit, during which the correction factor will be introduced. When the relay C11 is picked up, the fifth digit, or 4, will be supplied to the A relays and the fourth digit will be supplied to the B relays. The rotor of the control transformer Y4 will be in series with the amplifier A1, and its stator will be provided with a voltage from the control transformer Y5 which is determined both by the stored digit on the B relays and a correction supplied to the rotor of the transformer Y5 by the servomotor M2.

The operation of the servomotor M2 will take place as soon as the relay B7 has been picked up in the cycle. At this time, with the switch S2 in its A position, a bridge comprising the potentiometers P1 and P9 and the bridge comprising the temperature-responsive resistor RT will be connected in series to operate the amplifier A3 and position the servomotor M2 to rotate the rotor of the transformer Y5 so that the necessary phase correction will be applied to the stator of the control transformer Y4. Any temperature variation which takes place will automatically be compensated for, and tool wear may normally be programmed on a basis such that adjustments to the potentiometers P1 through P8 may be made at scheduled times during a production operation.

Having described the operation of the apparatus of my invention under one typical condition, its operation under other conditions will be readily apparent to those skilled in the art. While I have described my invention with reference to the details of a preferred embodiment thereof, many changes and variations will be apparent to those skilled in the art and such can obviously be made without departing from the scope of my invention.

Having thus described my invention, what I claim is:

1. In combination, a servomechanism for positioning an output shaft in accordance with two applied position address signals corresponding to adjacent digits of a selected position in a predetermined number system, said servomechanism being provided with at least two selectively connectible followup means having rebalancing ratios differing by an order of magnitude in said number system, first switching means operable to first and second states for operatively connecting said first followup means in said servomechanism in its first state and operatively connecting said second followup means in said servomechanism in its second state, a register for storing a position address signal, means controlled by said register for applying the stored position address signal to said servomechanism, a source of position address signals corresponding to at least three digits of a position address, and sequencing means operable when actuated to sequentially shift progressively lower ordered signals from said source to said register and simultaneously apply the next lower ordered signal from said source to said servomechanism, and means controlled by said sequencing means for actuating said switching means to its first state when the highest ordered signal is shifted to said register and to its second state when the second ordered signal is shifted to said register.

2. In combination, a servomechanism for positioning an output shaft in accordance with two applied position address signals corresponding to adjacent digits of a selected position in a predetermined number system, said servomechanism being provided with at least two selectively connectible followup means having rebalancing ratios differing by an order of magnitude in said number system, first switching means operable to first and second states for operatively connecting said first followup means in said servomechanism in its first state and operatively connecting said second followup means in said servomechanism in its second state, a register for storing a position address signal, means controlled by said register for applying the stored position address signal to said servomechanism, a source of position address signals corresponding to at least three digits of a position address, sequencing means operable when actuated to sequentially shift progressively lower ordered signals from said source to said register and simultaneously apply the next lower ordered signal from said source to said servomechanism, means controlled by said sequencing means for actuating said switching means to its first state when the highest ordered digit is shifted to said register, means controlled by said sequencing means for actuating said switching means to its second state when the second ordered digit is shifted to said register, and means responsive to movement of the shaft for interrupting the operation of said sequencing means when said shaft is in motion.

3. A digitally controlled servomechanism comprising a servomotor having an output shaft, followup control means for said servomotor for adjusting said shaft to a position directed by two applied progressively lower ordered position address signals, said followup control means comprising first and second selectively operable means each responsive to the position of said shaft and operative when connected in said followup control means to produce a signal balancing said position address signals at the shaft position corresponding to the position address signals, the signal increment produced by said first shaft responsive means being an order of magnitude less than the signal increment produced by said second shaft responsive means for the same movement of the shaft within a predetermined range, a register for storing a position address signal, means controlled by the register for applying the stored position address signal to said followup control means, a source of at least three progressively lower ordered position address signals, sequentially operable switching means having first and second states, means actuated by said switching means in its first state for applying the highest ordered signal from said source to said register and the next lower ordered signal to said followup control means, means actuated by said switching means in its first state for connecting said first selectively operable means in said followup control means, whereby said shaft is moved to a position corresponding to the highest ordered two digits of a position address, means actuated by said switching means in its second state for applying said next lower ordered signal from said source to said register and the third ordered signal from said source to said followup control means, means actuated by said switching means in its second state for connecting said second selectively operable means in said followup control means, whereby said shaft is moved to a position corresponding to a three digit position address, sequencing means operable from a first state to a second state when actuated, means controlled by said sequencing means in its first state for actuating said switching means to its first state, means responsive to movement of said shaft for producing a signal when said shaft is stationary, and means controlled by said sequencing means in its second state and said last recited signal for actuating said switching means to its second state.

4. A digitally controlled servomechanism comprising a servomotor having an output shaft, followup control means for said servomotor for adjusting said shaft to a position directed by two applied progressively lower ordered position address signals, said followup control means comprising first and second selectively operable means each responsive to the position of said shaft and operative when connected in said followup control means to produce a signal balancing said position address signals at the shaft position corresponding to the position address signals, the signal increment produced by said first shaft responsive means being an order of magnitude less than the signal increment produced by said second shaft responsive means for the same movement of the shaft within a predetermined range, a register for storing a position address signal, means controlled by the register for applying the stored position address signal to said followup control means, a source of at least three progressively lower ordered position address signals, sequentially operable switching means having first and second states, means actuated by said switching means in its first state for applying the highest ordered signal from said source to said register and the next lower ordered signals to said followup control means, means actuated by said switching means in its first state for connecting said first selectively operable means in said followup control means, whereby said shaft is moved to a position corresponding to the highest ordered two digits of a position address, means actuated by said switching means in its second state for applying said next lower ordered signal from said source to said register and the third ordered signal from said source to said followup control means, and means actuated by said switching means in its second state for connecting said second selectively operable means in said followup control means, whereby said shaft is moved to a position corresponding to a three digit position address.

5. A digitally controlled servomechanism, comprising a servomotor having an output shaft, a source of at least first, second and third shaft position address signals of progressively lower order in a predetermined number system and together representing a selected position of said shaft relative to a selected reference position, a register for storing at least one of said shaft position address signals, means responsive to the position of said shaft for producing first and second shaft position signals each corresponding to the shaft position, said first position signal being greater than said second position signal by an order of magnitude in said number system, servomotor control means responsive to two applied adjacent-ordered shaft position address signals and one of said shaft position signals for producing an error signal corresponding to the difference between the actual shaft position and the shaft position represented by said address signals, means controlled by said register for applying a position address signal stored in the register to said servomotor control means, means responsive to said error signal for actuating said servomotor to reduce said error signal substantially to zero, switching means sequentially operable to first and second states, means actuated by said switching means in its first state for storing said first signal from said source in said register, means actuated by said switching means in its first state for applying said first shaft position signal to said servomotor control means, means actuated by said switching means in its first state for applying said second signal from said source to said servomotor control means, whereby said servomotor is actuated to position said shaft in accordance with the highest ordered two digits of said selected shaft position when said switching means is in its first state, means controlled by said switching means in its second state for storing said second signal from said source in said register, means actuated by said switching means in its second state for applying said second shaft position signal to said servomotor control means, and means actuated by said switching means in its second state for applying said third signal from said source to said servomotor control means, whereby said servomotor is actuated to position said shaft in accordance with the lowest ordered two digits of said selected shaft position when said switching means is in its second state.

6. A digitally controlled servomechanism, comprising a servomotor having an output shaft, a source of at least first, second and third shaft position address signals of progressively lower order in a predetermined number system and together representing a selected position of said shaft relative to a selected reference position, a register for storing at least one of said shaft position address signals, means responsive to the position of said shaft for producing first and second shaft position signals each corresponding to the shaft position, said first position signal being greater than said second position signal by an order of magnitude in said number system, servomotor control means responsive to two applied adjacent-ordered shaft position address signals and one of said shaft position signals for producing an error signal corresponding to the difference between the actual shaft position and the shaft position represented by said address signals, means controlled by said register for applying a position address signal stored in the register to said servomotor control means, means responsive to said error signal for actuating said servomotor to reduce said error signal substantially to zero, switching means sequentially operable to first and second states, means actuated by said switching means in its first state for storing said first signal from said source in said register, means actuated by said switching means in its first state for applying said first shaft position signal to said servomotor control means, means actuated by said switching means in its first state for applying said second signal from said source to said servomotor control means, whereby said servomotor is actuated to position said shaft in accordance with the highest ordered two digits of said selected shaft position when said switching means is in its first state, means controlled by said switching means in its second state for storing said second signal from said source in said register, means actuated by said switching means in its second state for applying said second shaft position signal to said servomotor control means, means actuated by said switching means in its second state for applying said third signal from said source to said servomotor control means, whereby said servomotor is actuated to position said shaft in accordance with the lowest ordered two digits of said selected shaft position when said switching means is in its second state, sequencing means operable from a first state to a second state when actuated, means controlled by said sequencing means in its first state for actuating said switching means to its first state, means responsive to movement of said shaft for producing a signal when said shaft is stationary, and means controlled by said sequencing means in its second state and said last recited signal for actuating said switching means to its second state.

7. In combination, a servomotor having an output shaft, control means operatively connected to said servomotor and responsive to an applied signal to drive said output shaft in a sense dependent on the sign of said signal, first and second transducer means each having an input shaft, input terminals and output terminals and each responsive to a signal having a value within a predetermined range applied to its input terminals to produce an output signal at its output terminals varying from a maximum value proportional to the input signal to substantially zero in dependence on the position of the input shaft, the position of the shaft corresponding to a zero output signal being different for each different output signal within said range, means drivably connecting said servomotor output shaft to the input shaft of said first transducer means to move it a predetermined first increment for each increment of motion of the output shaft, motion reducing means drivably connecting said servomotor output shaft to the input shaft of said second transducer means to move it a predetermined second increment for each increment of motion of the output shaft, said second increment being an order of magnitude smaller than said first increment in a predetermined number system, summing means operatively connected to said control means and responsive to two applied signals for applying to said control means a signal determined by the algebraic sum of the two applied signals, a source of at least three progressively lower ordered position address signals representing a selected shaft position in said number system, a register for storing a position address signal, sequentially operable switching means having first and second states, means actuated by said switching means in its first state for applying the highest ordered signal from said source to said register and connecting the register to apply the stored signal to the input terminals of said second transducer means, means actuated by said switching means in its first state for applying the next lower ordered signal from said source to said summing means, means actuated by said switching means in its first state for applying the signal from the output terminals of said second transducer means to said summing means, whereby said shaft is moved to a position corresponding to the highest ordered two digits of a selected position, means actuated by said switching means in its second state for applying said next lower ordered signal from said source to said register and connecting the register to apply the stored signal to the input terminals of said first transducer means, means actuated by said switching means in its second state for applying the third ordered signal from said source to said summing means, and means actuated by said switching means in its second state for applying the output signal from said first transducer means to said summing means, whereby said shaft is moved to a position corresponding to said three digits.

8. A digitally controlled servomechanism, comprising a servomotor having an output shaft, a control amplifier operatively connected to said servomotor to drive said output shaft in a sense determined by the sign of an error signal applied to said amplifier, signal summing means operatively connected to said amplifier for applying an error signal to the amplifier corresponding to the algebraic sum of at least two applied signals, first and second electromechanical transducers each comprising an input shaft and circuit means controlled by the input shaft and responsive to an applied signal within a predetermined range to produce an output signal determined by the input signal and the shaft position and having a null at a different shaft position corresponding to each different input signal within a predetermined range, motion transmitting means drivably connecting said servomotor output shaft to the input shaft of said first transducer through a first drive ratio and to the input shaft of said second transducer through a second drive ratio, said second drive ratio being larger than said first drive ratio by an order of magnitude in a predetermined number system, a register for storing a signal representing a digit in said number system corresponding to a digit of a selected servomotor output shaft position address with respect to a selected reference position, first switching means connected to said register and selectively operable to different states to apply a signal corresponding to the stored signal to said first transducer in one state and to said second transducer in another state, a source of at least three progressively lower ordered signals representing the digits of a shaft position in said number system, second switching means sequentially operable to first and second states, means controlled by said second switching means in its first state for applying the highest ordered signal from said source to the register and operating said first switching means to connect the register to said second transducer, means controlled by said second switching means in its first state for applying the second ordered signal from said source to said summing means, means controlled by said second switching means in its first state for applying the output signal from said second transducer to said summing means, means controlled by said second switching means in its second state for applying the second ordered signal from said source to said register and operating said first switching means to connect the register to said first transducer, means controlled by said second switching means in its second state for applying the third ordered signal to said summing means, and means controlled by said switching means in its second state for applying the output signal from said first transducer to said summing means, whereby upon sequential operation of said switching means from its first state to its second state with an intervening interval permitting rebalancing of the servomechanism, said output shaft is moved to a position corresponding to the signals from said source.

9. In combination, a first movable element, second and third elements alternatively movable to an operating position with respect to said first element, first servomotor means for positioning said first element, a manually operable digital signal generator for producing a first control signal, position transducer means controlled by said servomotor means for producing a second control signal in accordance with the position of said first element, control means movable over a range of positions for combining said first and second signals to produce a third control signal in accordance with the difference between said first and second signals modified by an increment determined by the position of said control means, means responsive to said third control signal for actuating said first servomotor means to reduce said third control signal to zero, second servomotor means for positioning said control means; first and second manually operable signal generating means for producing fourth and fifth control signals, means responsive to movement of said second element to said operating position for connecting said first signal generating position for connecting said first signal generating means to control said second servomotor, means to move said control means to a position corresponding to said fourth signal, and means responsive to movement of said third element to said operating position for connecting said second signal generator to control said second servomotor means to move said control means to a position corresponding to said fifth signal.

10. Control apparatus for a numerically controlled machine provided with a plurality of tools mounted for movement over a range of positions in each of which a different tool is in operating relation to a workpiece, a numerically controlled servomechanism for adjusting the extent of movement with respect to the workpiece of the tool in operating relation to the workpiece, said servomechanism comprising a servomotor and circuit means for producing a control signal to actuate said servomotor, said control apparatus comprising a control transformer connected in series with said circuit means and having an input shaft rotatable to modify said control signal by an amount determined by the extent of rotation within a predetermined range, servomotor means for rotating said control transformer to an extent dependent on the magnitude of an applied signal, a plurality of manually adjustable signal generators each associated with a different one of said tools and each manually adjustable to produce a first compensating signal, signal generating means responsive to the temperature of said machine for producing a second compensating signal, and switching means controlled by the position of said tools for applying in series to the servomotor means the first compensating signal from the manually adjustable signal generator associated with the tool in operating relation to the workpiece and the second compensating signal.

11. Control apparatus for a numerically controlled machine provided with a plurality of tools mounted for movement over a range of positions in each of which a different tool is in operating relation to a workpiece, a numerically controlled servomechanism for adjusting the extent of movement with respect to the workpiece of the tool in operating relation to the workpiece, and circuit means for producing a control signal to actuate said servomechanism, said control apparatus comprising a first signal generator connected in series with said circuit means and being adjustable in response to an applied signal to modify said control signal by an amount proportional to the applied signal, a plurality of manually adjustable signal generators each associated with a different one of said tools and each manually adjustable to produce a first compensating signal, signal generating means responsive to the temperture of said machine for producing a second compensating signal, and switching means controlled by the position of said tools for applying in series to said first signal generator the first compensating signal for the manually adjustable signal generator associated with the tool in operating relation to the workpiece and the second compensating signal.

12. A manually sequenced numerically controlled servomechanism, comprising, in combination, a manually actuable pushbutton, a program counter, means for storing a sequence of progressively lower ordered position signals, a servomotor, a control amplifier connected to said servomotor to operate it in accordance with an applied voltage, a tachometer generator connected for operation by said servomotor to produce an output voltage in accordance with the speed and direction of movement of said servomotor, a relay connected to said tachometer generator and actuated to a first or a second state according as said generator is or is not producing an output voltage, means controlled by said pushbutton and said relay in its second condition for stepping said program counter to a different state for each actuation of the pushbutton, and means controlled by said storage means and said program counter for applying the output voltage of said tachometer generator and a voltage in accordance with a stored position signal selected sequentially in accordance with the state of the program counter to said servomotor amplifier.

References Cited

UNITED STATES PATENTS

| | | | |
|---|---|---|---|
| 2,776,397 | 1/1957 | McWilliams | 318—30 X |
| 2,950,427 | 8/1960 | Tripp | 319—30 X |
| 3,017,749 | 1/1962 | Heppler et al. | 318—28 X |
| 3,064,169 | 11/1962 | Mynall | 318—28 |
| 3,076,363 | 2/1963 | Hack | 82—2 |
| 3,079,522 | 2/1963 | McGarrell | 318—162 |
| 3,101,436 | 8/1963 | Younkin | 318—162 |
| 3,124,985 | 3/1964 | Curtis et al. | 82—2 |
| 3,172,026 | 3/1965 | Schuman | 318—162 X |
| 3,218,532 | 11/1965 | Toscano | 318—162 |
| 3,289,061 | 11/1966 | Stratman | 318—18 |

BENJAMIN DOBECK, *Primary Examiner.*

G. A. DOST, *Assistant Examiner.*